United States Patent [19]

Shechterman

[11] Patent Number: 5,022,724
[45] Date of Patent: Jun. 11, 1991

[54] ZOOM SYSTEM

[75] Inventor: Mark Shechterman, Nes-Ziona, Israel

[73] Assignee: El-Op Electro-Optics Industries, Rehovot, Israel

[21] Appl. No.: 475,276

[22] Filed: Feb. 5, 1990

[30] Foreign Application Priority Data

Feb. 15, 1989 [IL] Israel ............................ 89301

[51] Int. Cl.$^5$ ........................................... G02B 15/00
[52] U.S. Cl. ..................................... 350/1.3; 350/1.2; 350/423; 350/463; 350/465
[58] Field of Search .................. 380/1.2, 1.3, 423, 463, 380/465

[56] References Cited

U.S. PATENT DOCUMENTS

| | | | |
|---|---|---|---|
| 4,632,498 | 12/1986 | Neil | 350/1.2 |
| 4,659,171 | 4/1987 | Neil | 350/1.2 |
| 4,676,581 | 6/1987 | Roberts | 350/423 |
| 4,802,717 | 2/1989 | Kebo | 350/1.3 |

FOREIGN PATENT DOCUMENTS 2131973 6/1984 United Kingdom .................. 350/1.2

*Primary Examiner*—Bruce Y. Arnold
*Assistant Examiner*—J. P. Ryan
*Attorney, Agent, or Firm*—Fleit, Jacobson, Cohn, Price, Holman & Stern

[57] ABSTRACT

The invention relates to an infra-red objective zoom system providing a high performance over a range of magnifications of from about 0.5 to about 8 times with a correction for temperature changes in a wide range it comprises only five optical groups of a total of seven lense groups (termed herein A to D). These are arranged in the sequence of A, a front singlet lens of positive power with a diameter larger than that of the other lenses abberation, B a negative optical element consisting of lenses B' and B"; B' being a negative lens having a dispersive factor larger than that of the other lenses, resulting in achromatization of the system; B" is a negative lens. Both negative lenses B' and B" have under-corrected spherical abberations, C being a positive lens, D being a positive auxiliary lens, being at a fixed distance respective lens A; E being a movable collimator of positive optical power, lenses B, C and E being movable respective fixed lenses A and D, said lenses transmitting in the 3μ to 12μ range. Lenses A to D define an objective and E a collimator (eyepiece). The movements of lenses B, C and E are according to a predetermined program which takes into consideration changes of temperature of the system.

4 Claims, 15 Drawing Sheets

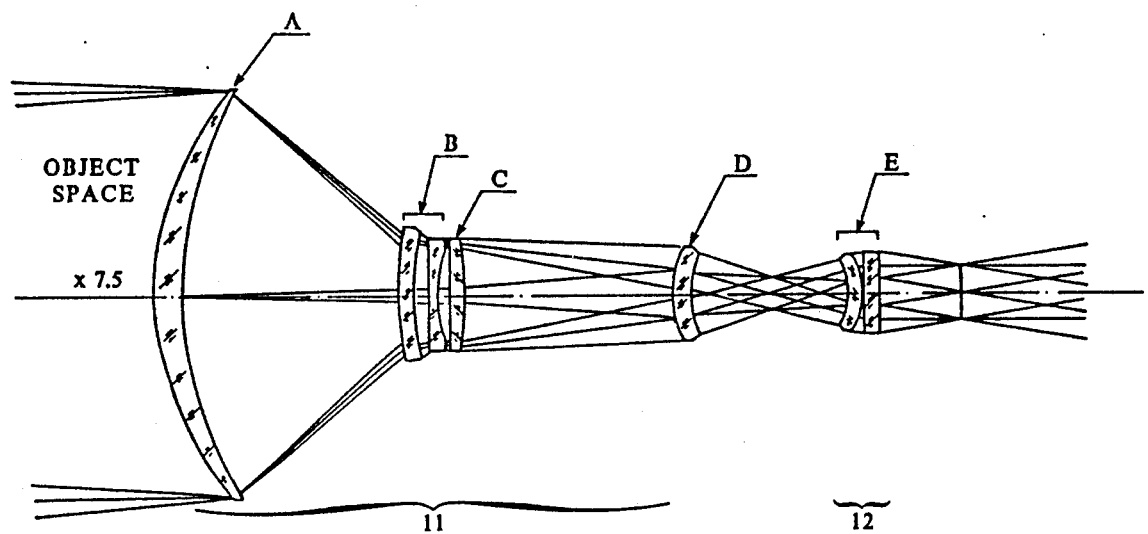
Fig. 1a
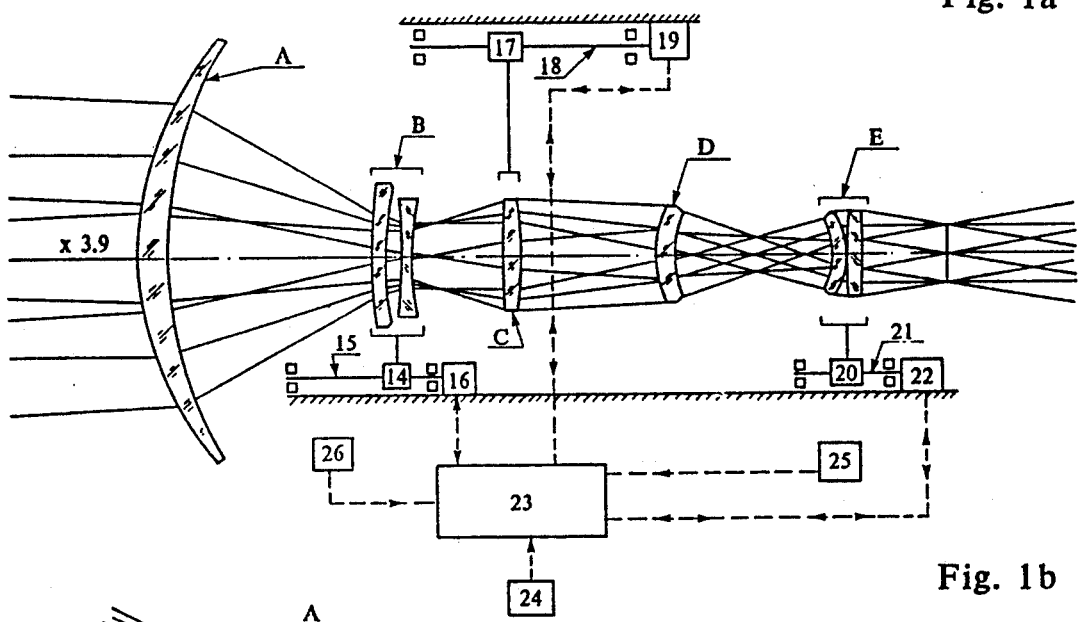
Fig. 1b
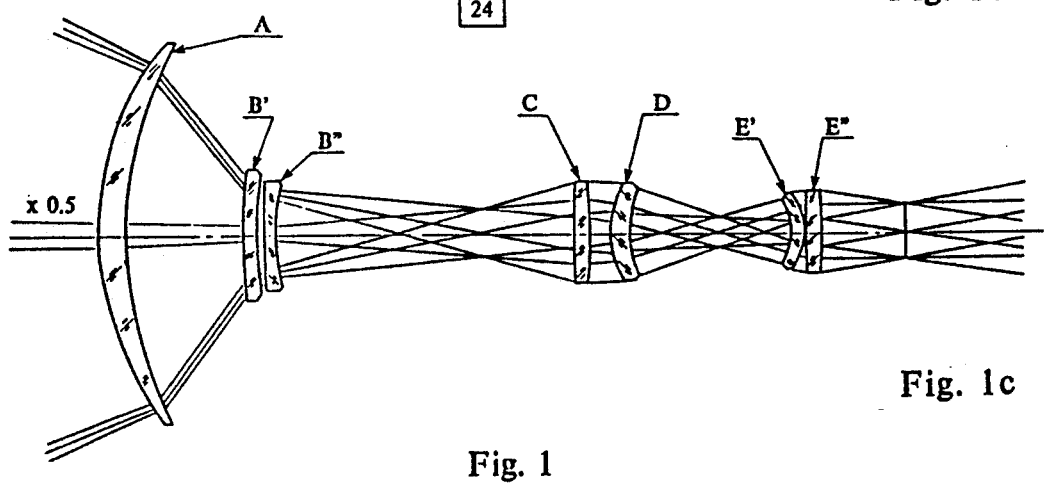
Fig. 1c
Fig. 1

MTF AT CENTER OF FIELD

MTF AT END OF VERTICAL FIELD

MTF AT 2/3 OF VERTICAL FIELD

DISTORTION GRAPH

MTF AT CENTER OF FIELD

MTF AT END OF VERTICAL FIELD

MTF AT 2/3 OF VERTICAL FIELD

DISTORTION GRAPH

MTF AT CENTER OF FIELD

MTF AT END OF VERTICAL FIELD

MTF AT 2/3 OF VERTICAL FIELD

DISTORTION GRAPH

MTF AT CENTER OF FIELD

MTF AT END OF VERTICAL FIELD

MTF AT 2/3 OF VERTICAL FIELD

DISTORTION GRAPH

MTF AT CENTER OF FIELD

MTF AT END OF VERTICAL FIELD

MTF AT 2/3 OF VERTICAL FIELD

DISTORTION GRAPH

MTF AT MIDDLE OF FIELD

MTF AT END OF VERTICAL FIELD

MTF AT 2/3 OF VERTICAL FIELD

DISTORTION GRAPH

ZOOM SYSTEM

FIELD OF THE INVENTION

The invention relates to an improved infra-red zoom system having a continuous wide range of magnifications, and which provides performance close to diffraction limit over the entire range of magnification providing also an efficient temperature compensation over the required range of temperatures.

The system is of simple construction, comprising a total of only seven lenses, these being arranged in 5 coaxial optical lens groups, three of which are movable, whereas two are fixed in position and at an invariable distance respective each other.

BACKGROUND OF THE INVENTION

Zooms for use in the I R range are required for both civilian and military uses. The required range varies, but is generally in the 3 to 12 micron range, with some zooms being designed for only part of this range. In most of existing IR lens systems the change of magnification is effected by insertion and removal of certain lenses or lens systems or their discrete axial movement. This provides only ability for discrete change of magnification. Such designs are comparatively simple, and they operate satisfactorily at a given temperature. The systems based on the insertion and removal of lenses have to fulfill two criteria: to have an adequate resolution near the diffraction limit for all fields, while resorting to the use of a minimum of inserted and removed optical elements because of severe requirement for optical transmittance. Resulting systems are generally based on a certain compromise, providing best results only for a narrow field of view and providing a small number of lenses for wide fields but with less stringent quality requirements.

Recently, several IR zoom telescopes using two simultaneously moving groups of lenses have been developed. Thermal compensation is achieved in some of these zoom telescopes by an additional movement of at least one of the groups. In other telescopes the temperature effects are compensated for by manual focus only.

All existing IR zoom systems suffer from relative low performance for part of the magnification range. The reason for this is simple. It is impossible to change the zoom magnification while preserving the resolution and a focality when only 2 lens groups are being moved. This situation becomes worse when temperature varies. Rapid change of the refractive index of Ge causes a sharp break in the aberration balance which in turn gives rise to a deterioration of the zoom performance.

The present invention provides zoom system with high optical performance and with full automatic compensation for changes of optical properties with a change of temperatures.

SUMMARY OF THE INVENTION

The invention relates to a zoom system for use in the IR, in the range of from about $3\mu$ to about $12\mu$. Similar systems can be built according to the invention for use in a narrower range of wavelengths. The novel zoom system is for use in civilian and in military applications and is characterized by a good MTF performance over the entire range of magnifications (which is as high as 1:16), irrespective of temperature changes in a predetermined range of temperatures. Good resolution over a wide range of magnifications and over a wide range of temperatures is of paramount importance for military applications.

The novel comparatively simple zoom system of only seven lenses in five optical elements makes possible a continuous range of magnifications (about 0.5 to 8 times) providing high performance close to the diffraction limit and this is independent on temperature changes.

The novel IR zoom system is characterized in that three optical elements lenses or lens groups (two of which comprise two lenses each) are moved in a predetermined manner respective two stationary optical elements. The optical elements are moved according to a computerized program which choose the location of these elements according to the required magnification and the measured temperature.

The following detailed description is by way of illustration only and it is clear that the detailed parameters are illustrative only.

BRIEF DESCRIPTION OF THE DRAWINGS

The following description illustrates certain specific embodiments of the present invention, and is to be considered in conjunction with the enclosed schematic figures, which are not according to scale and in which:

FIG. 1 is a schematical side-view in section, of a zoom of the invention, with FIGS. 1a, 1b and 1c illustrating arrangement with magnifications of $7.5\times$, $3.9\times$ and $0.5\times$;

FIGS. 5 to 10 are graphical representations, each containing four graphs, where

DESCRIPTION OF THE PREFERRED EMBODIMENT

An infra-red zoom telescope according to the invention comprises a system providing a high performance over a wide range of magnifications (from about 0.5 to about 8 times), with a correction for temperature changes in the $-35°$ C. to $55°$ C. range, comprising five optical groups of a total of seven lenses groups (termed herein A to D), which are arranged in the sequence of A, a front singlet lens of positive power with a diameter larger than that of the other lenses and which has an overcorrected spherical aberration, B a negative optical element consisting of lenses B' and B";

B' and B" being at a fixed distance respective each other;

B' being a negative lens having a dispersive factor larger than that of the other lenses, resulting in achromatization of the system;

B" is a negative lens. Both negative lenses B' and B" have under-corrected spherical aberrations that compensate overcorrected spherical aberration of lens A over the entire range of magnification.

C being a positive lens, modifying with lens B the magnification of the system;

D being a positive auxiliary lens, decreasing the overall length of the system, being at a fixed distance respective lens A;

E being a movable collimator of positive optical power, for maintaining the afocality of the system;

lenses B, C and E being movable respective fixed lenses A and D, said lenses transmitting in the $3\mu$ to $12\mu$ range, wherein lenses A to D define an objective and E a collimator (eyepiece), the movements of lenses B, C and E being according to a predetermined program which takes into consideration changes of temperature of the system.

Figure 2:
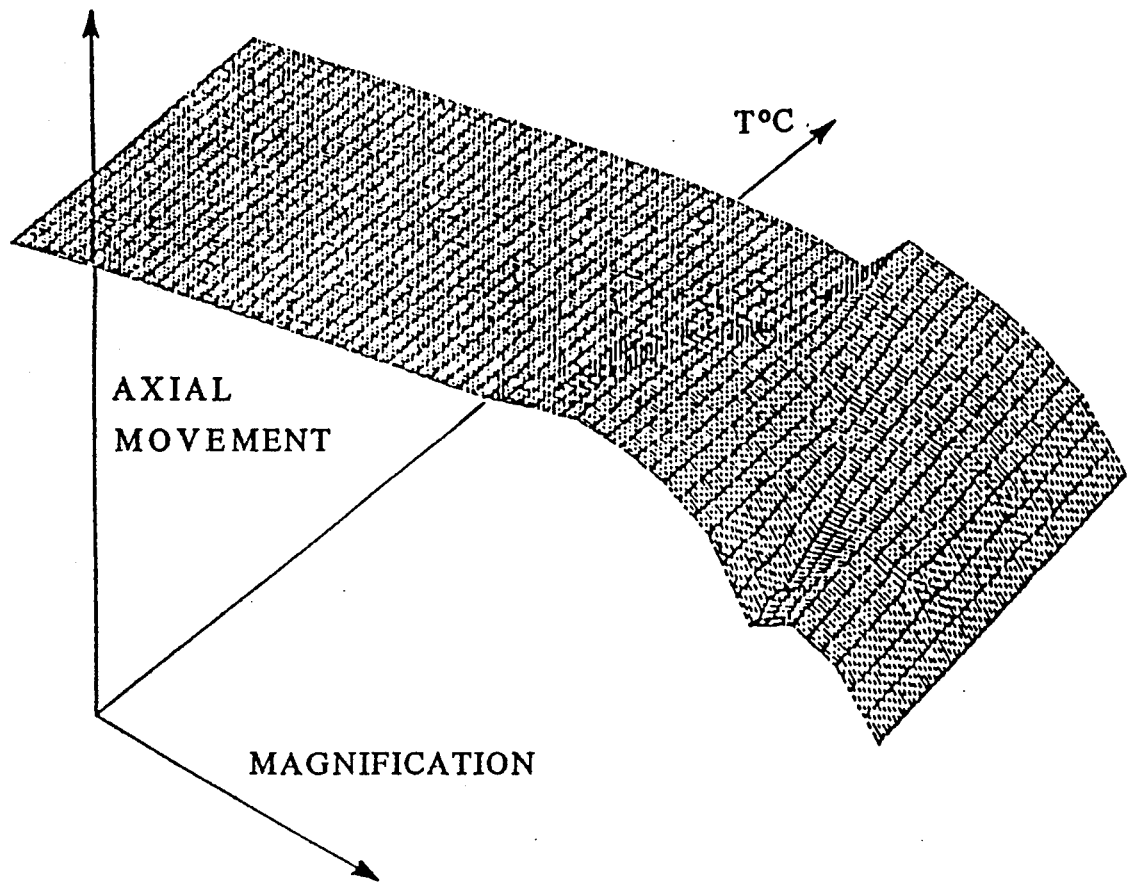
FIG. 2 is a spatial representation of the calculated position of the movable lens element B as function of magnification and temperature.
Figure 3:
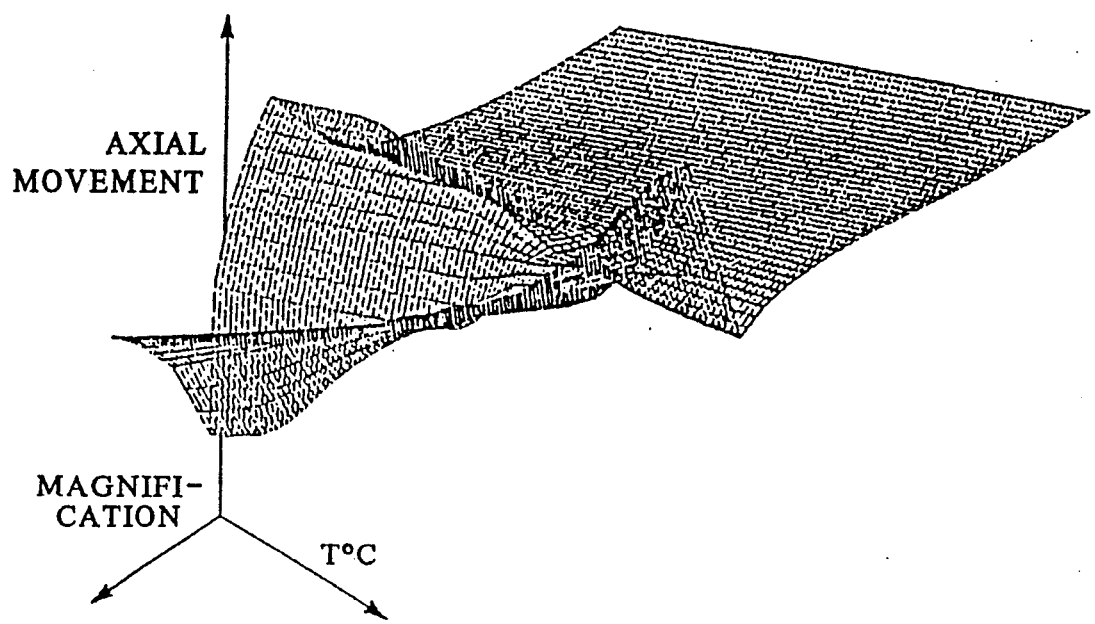
FIG. 3 is a similar spatial representation of lens C.
Figure 4:
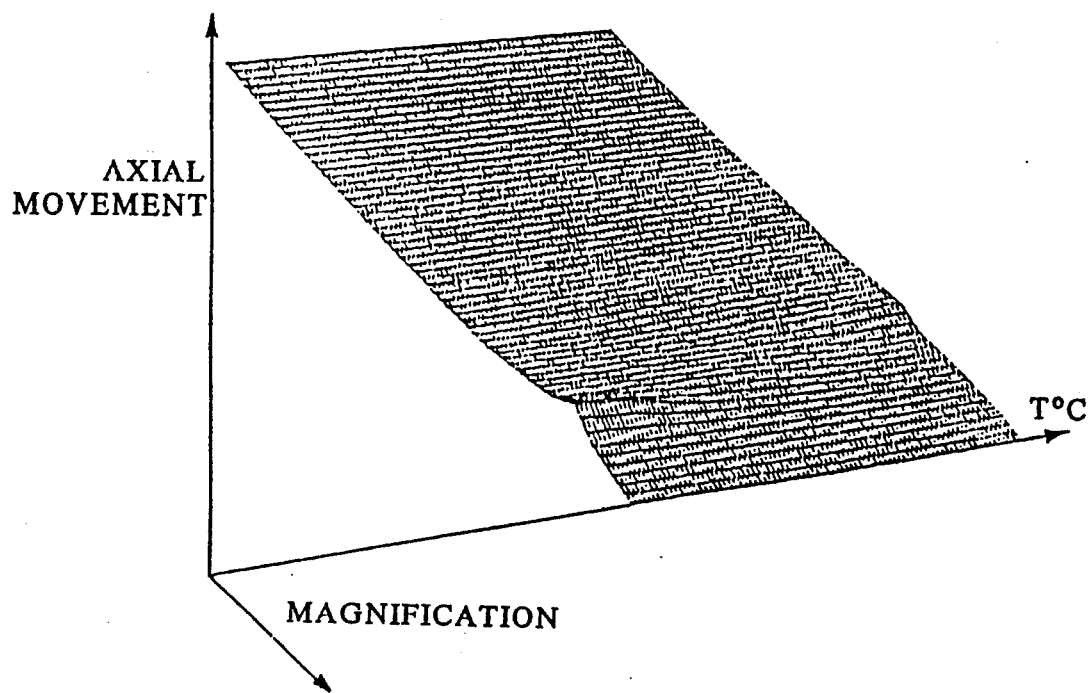
FIG. 4 is a similar representation of lens F (collimator)
Figure 5A:
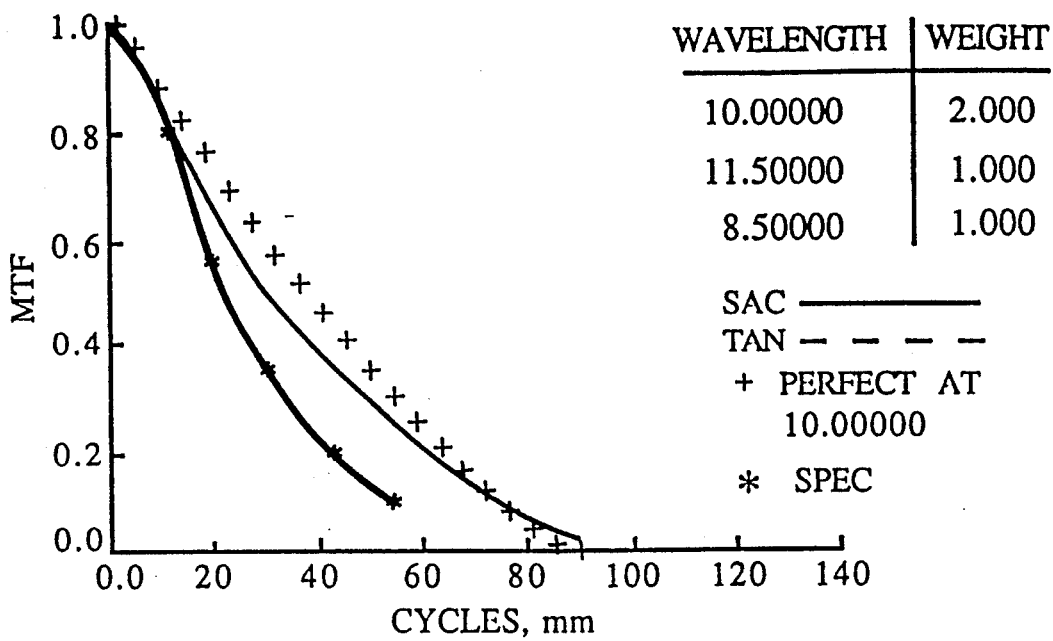
FIGS. 5a–5d present data of performance of a zoom device of the invention for equivalent focal length of 180 mm ($7.5\times$ magnification of the zoom telescope and detector lens EFL of 24 mm); curve with asterisks represents usual requirements to existing IR optical systems.
Figure 5B:
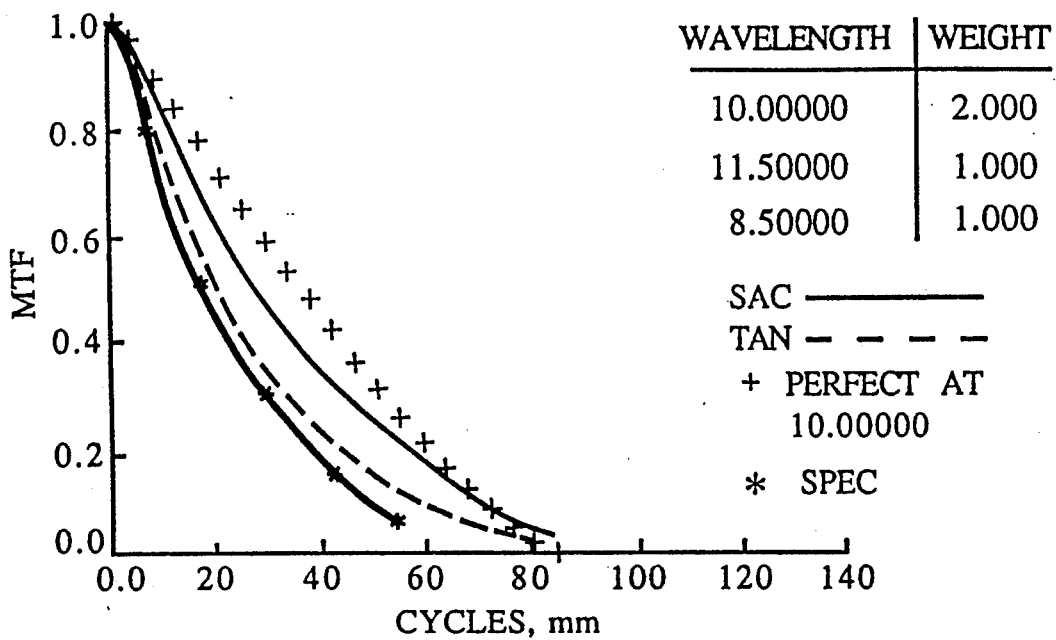
Figure 5C:
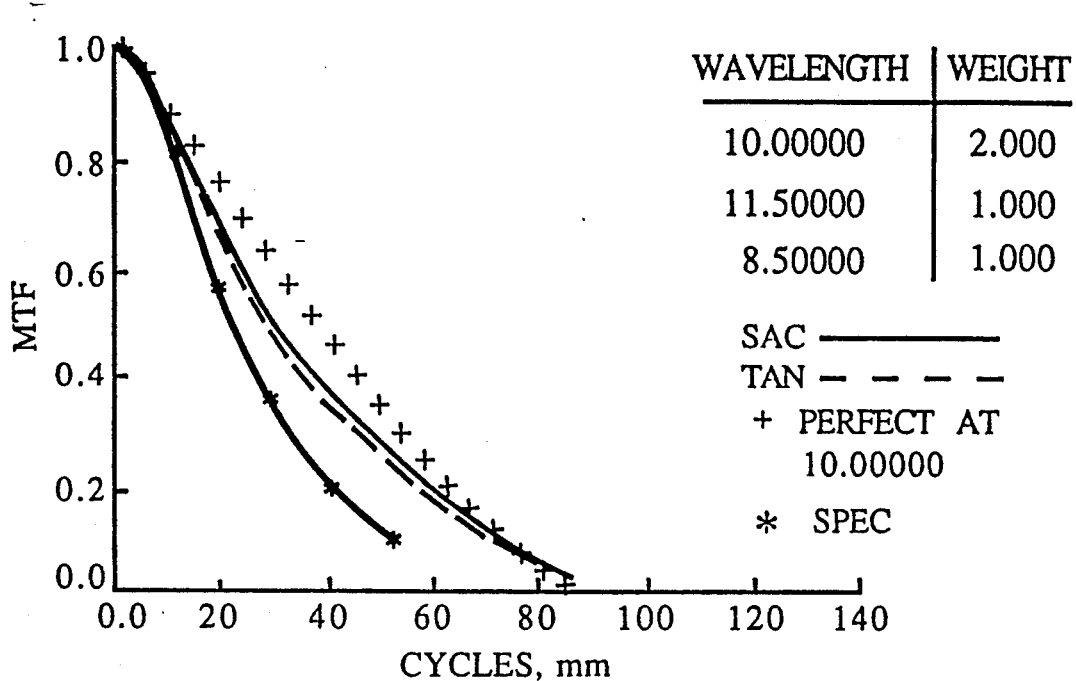
Figure 5D:
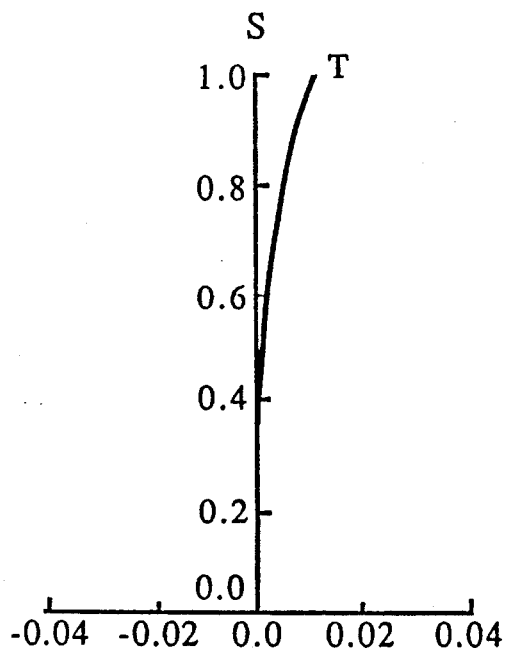
Figure 6A:
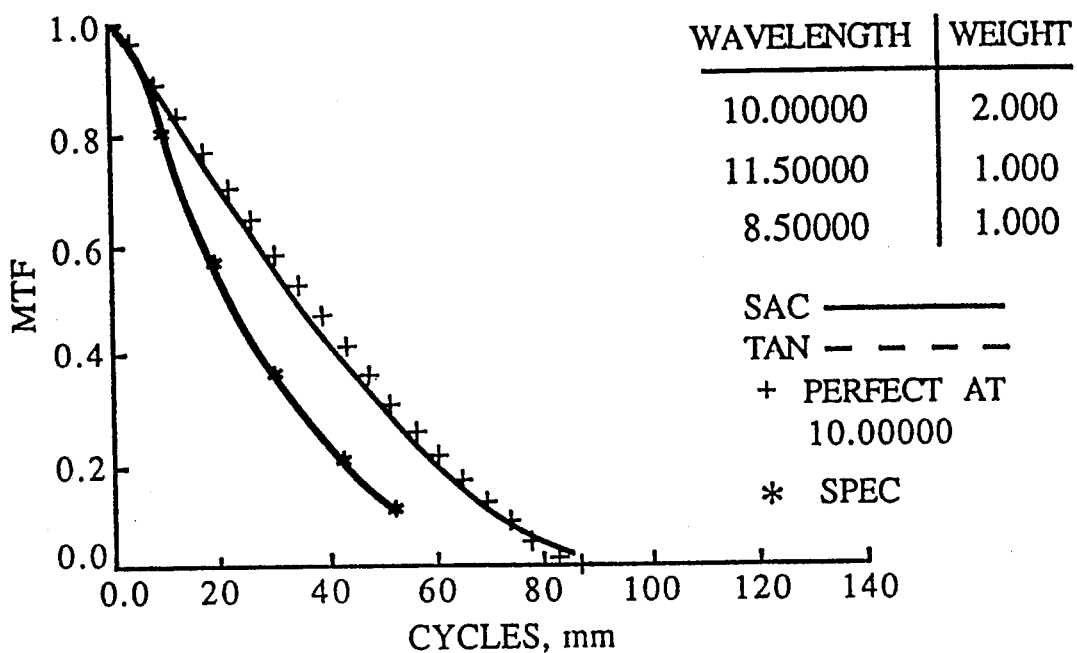
FIGS. 6a–6d give these data for an equivalent focal distance of 127 mm ($5.3\times$); curve with asterisks represent usual requirements to existing IR optical systems.
Figure 6B:
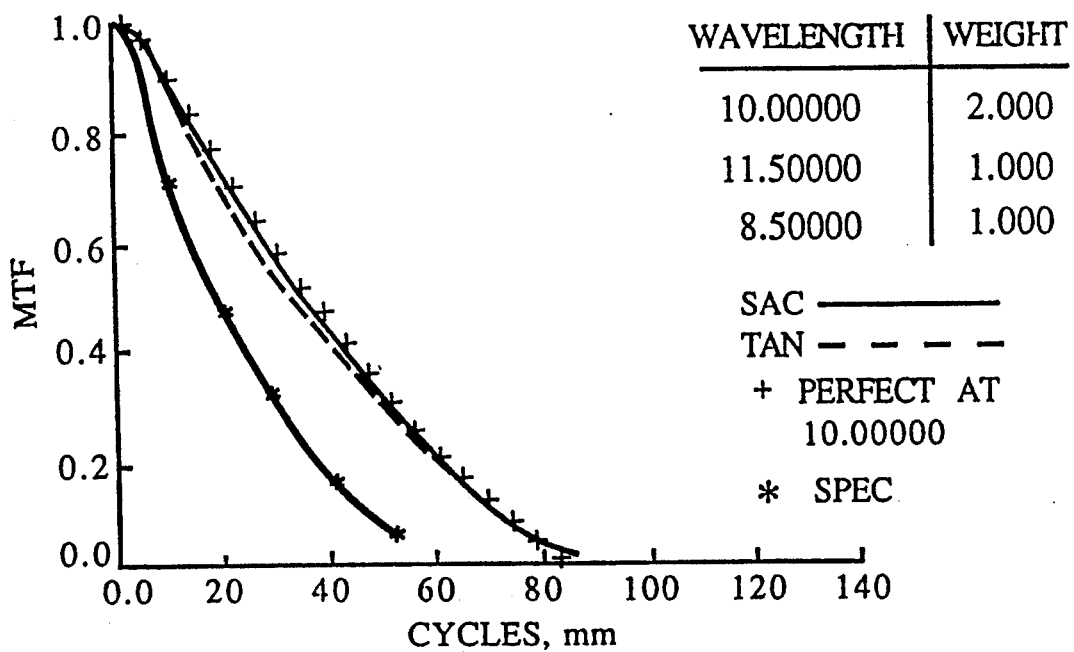
Figure 6C:
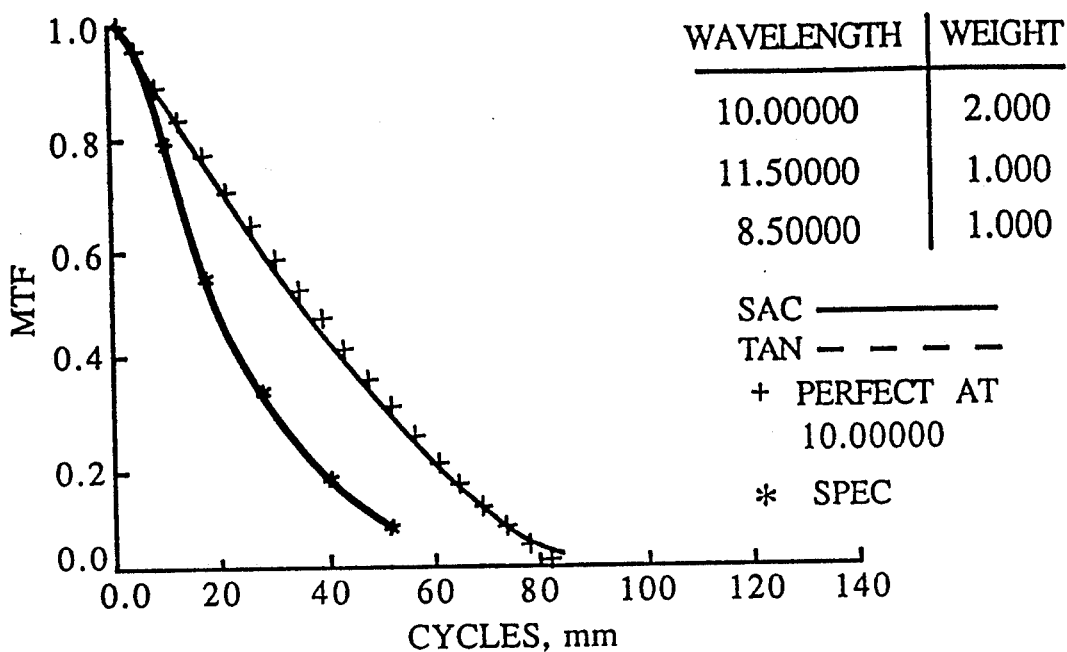
Figure 6D:
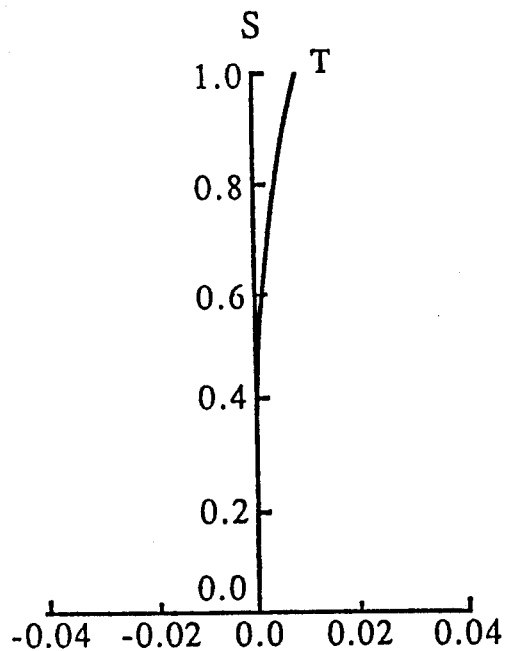
Figure 7A:
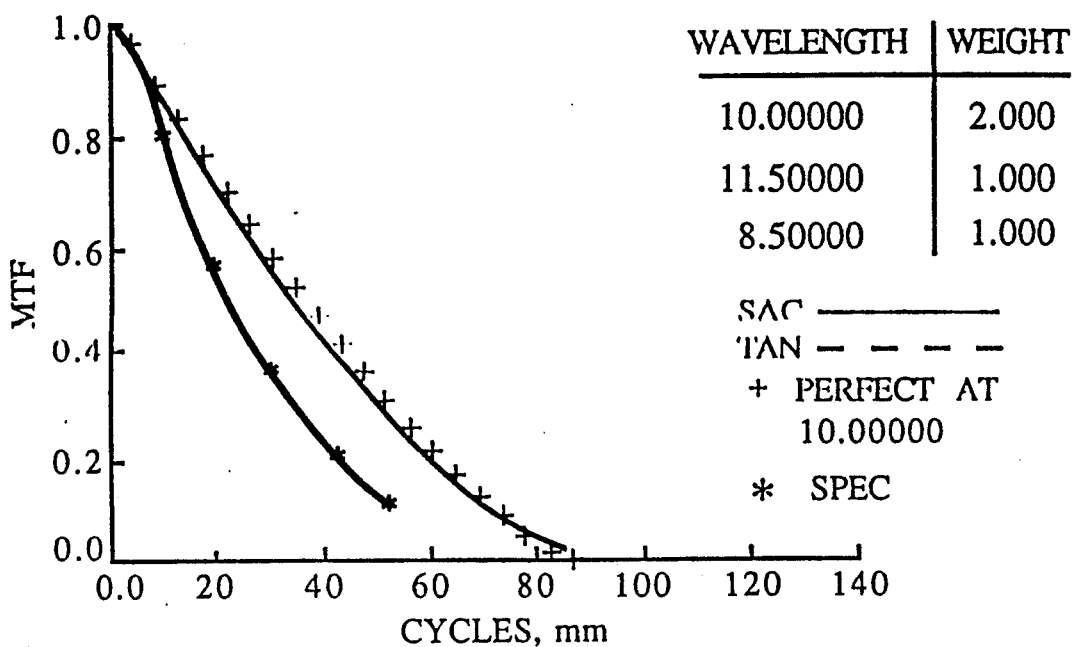
FIGS. 7a–7d give these data for an EFL of 94 mm ($3.9\times$)
Figure 7B:
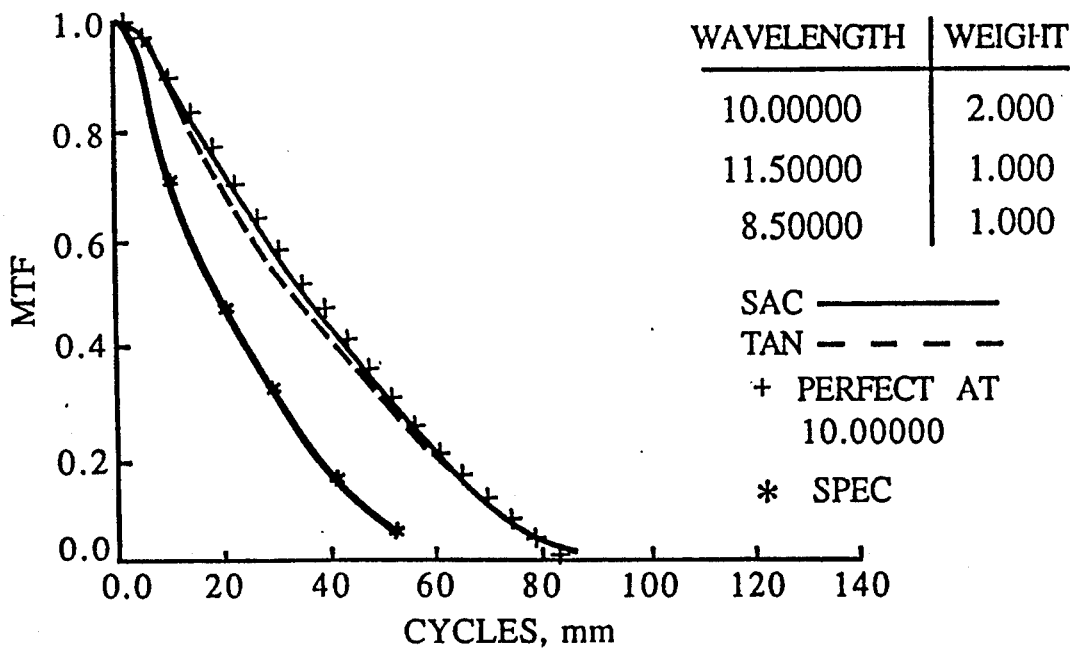
Figure 7C:
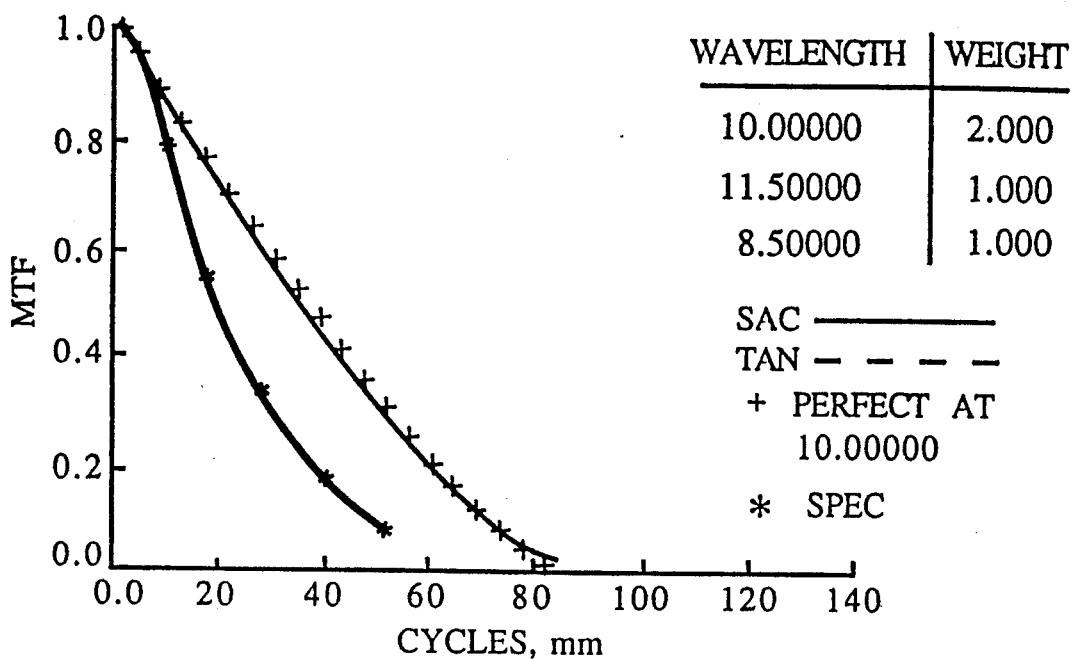
Figure 7D:
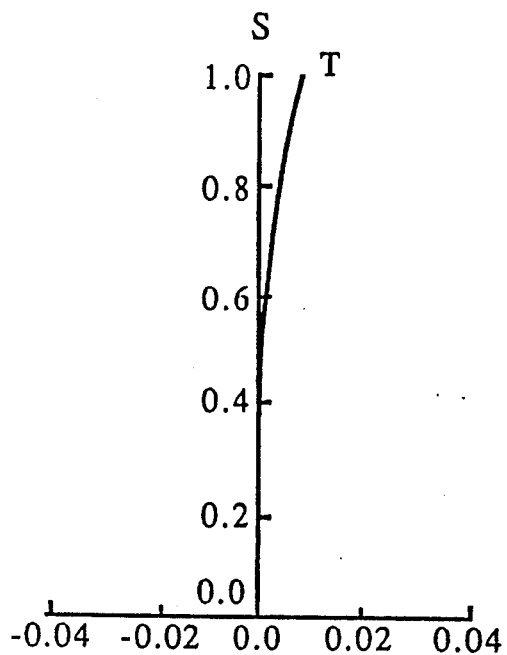
Figure 8A:
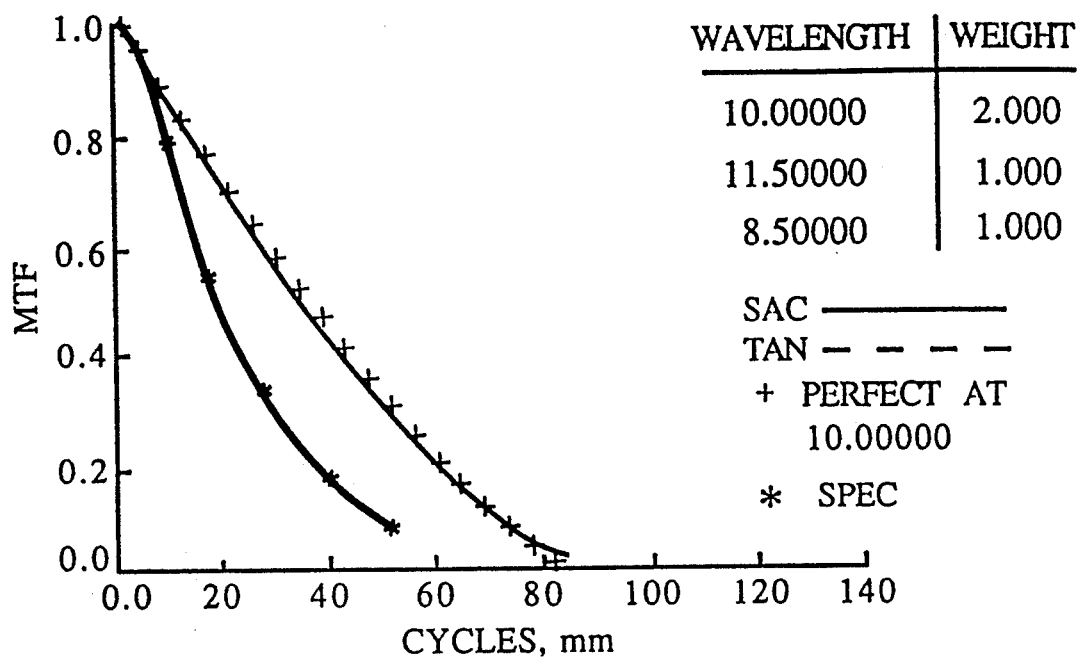
FIGS. 8a–8d give these data for an EFL of 51.5 mm ($2.2\times$)
Figure 8B:
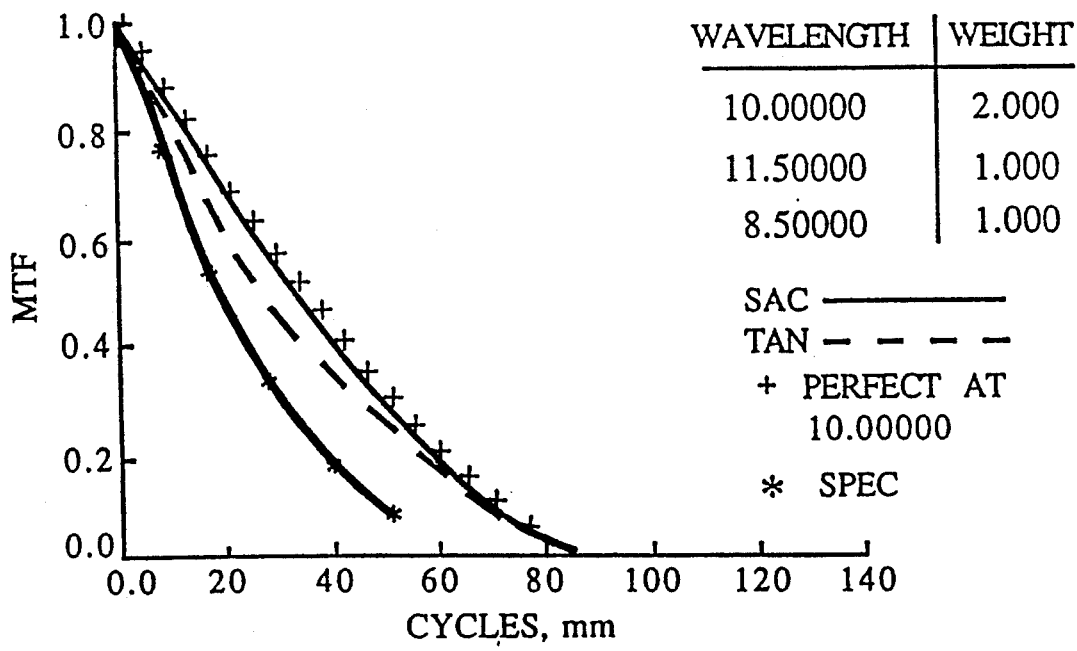
Figure 8C:
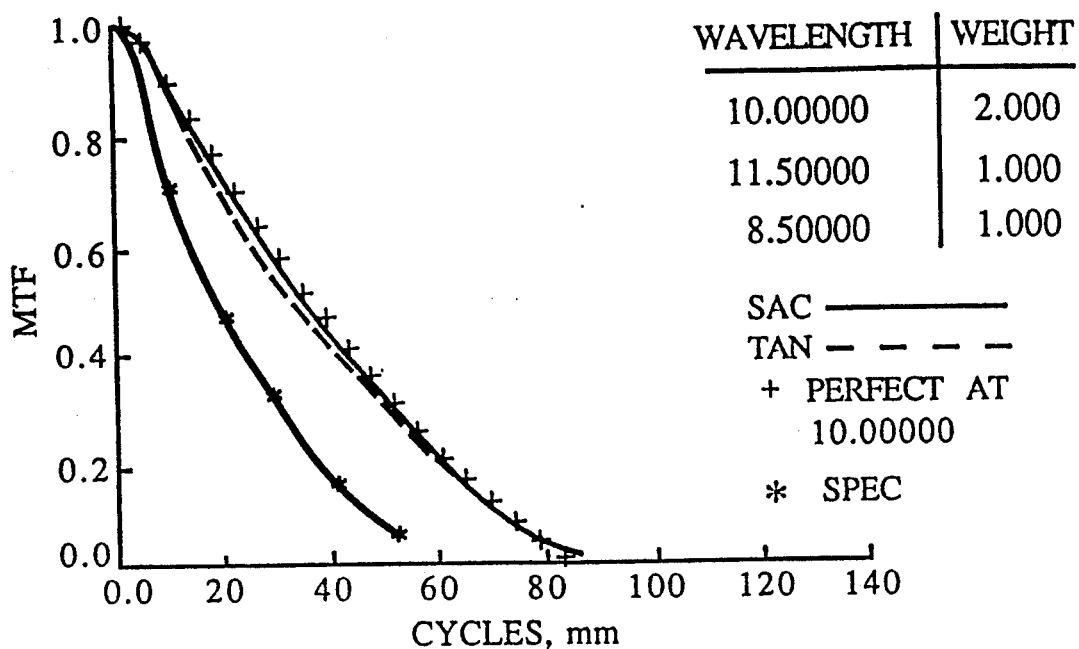
Figure 8D:
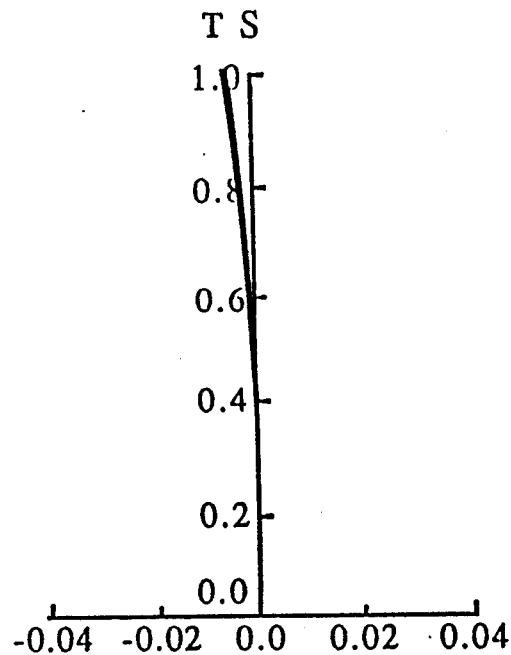

FIG. 8a represents the performance of the zoom device for equivalent focal distance of 52 mm ($\times 2.2$ magnification of the zoom telescope).

Figure 9A:
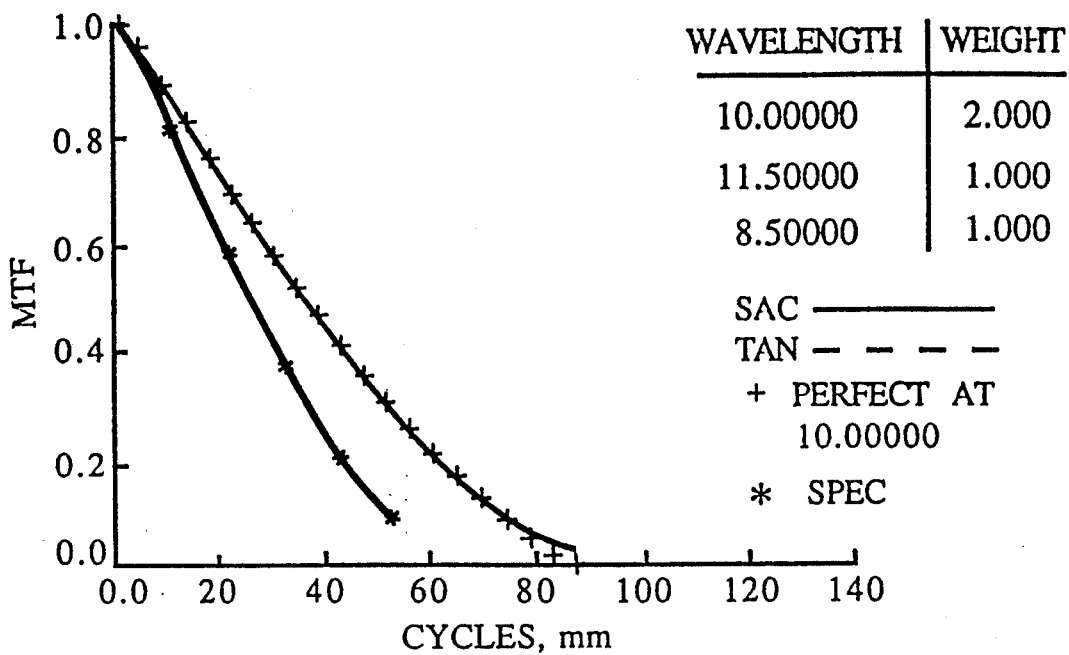
FIGS. 9a–9d give these data for an EFL of 26.6 mm ($1.1\times$)
Figure 9B:
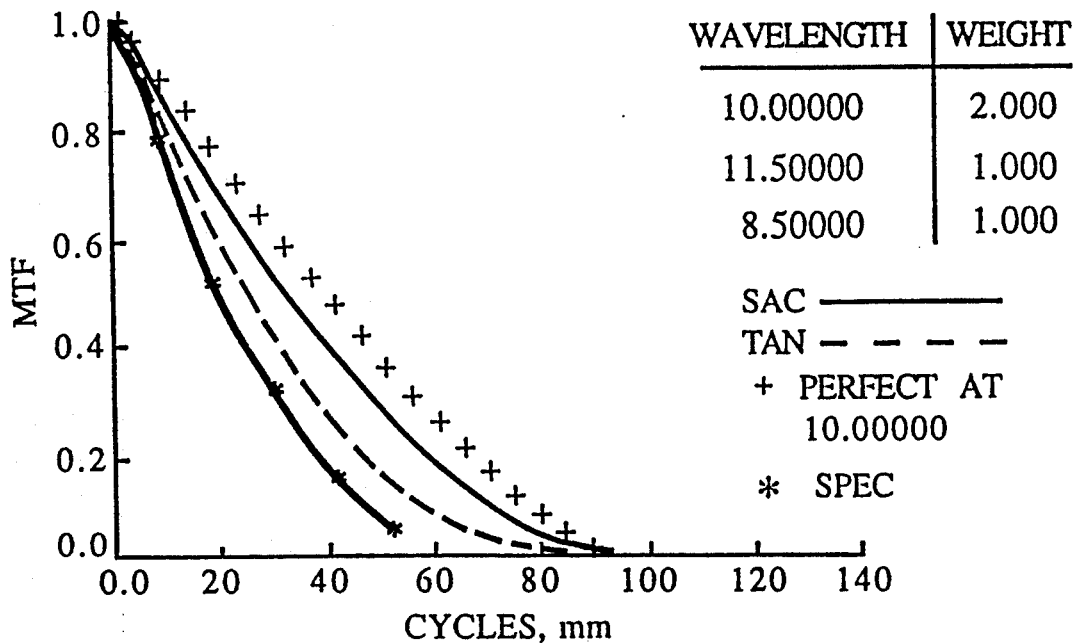
Figure 9C:
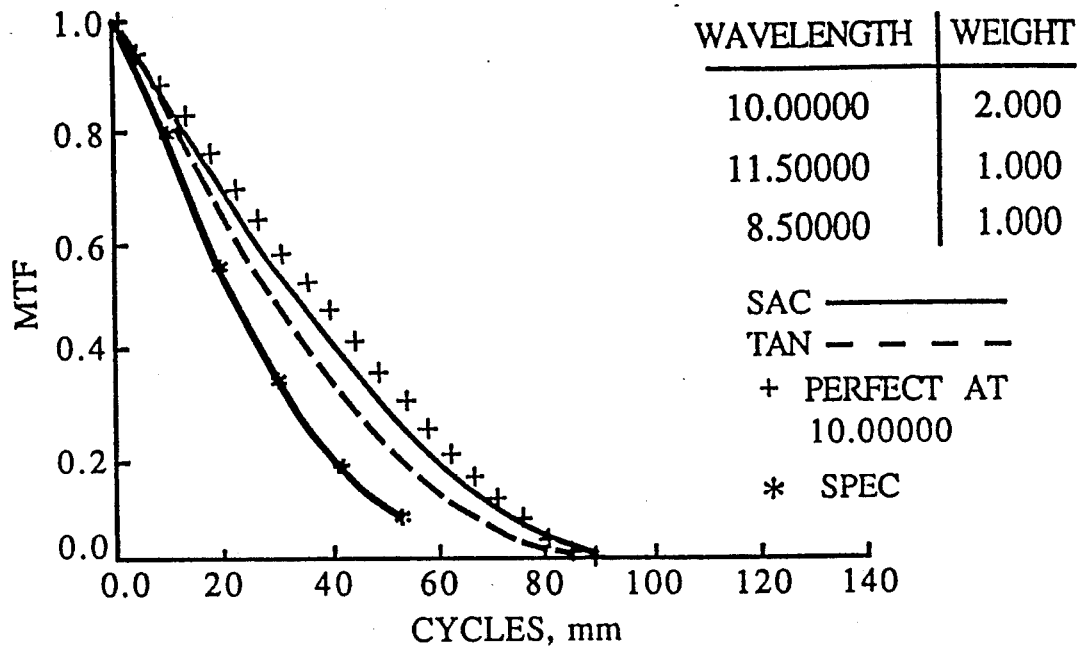
Figure 9D:
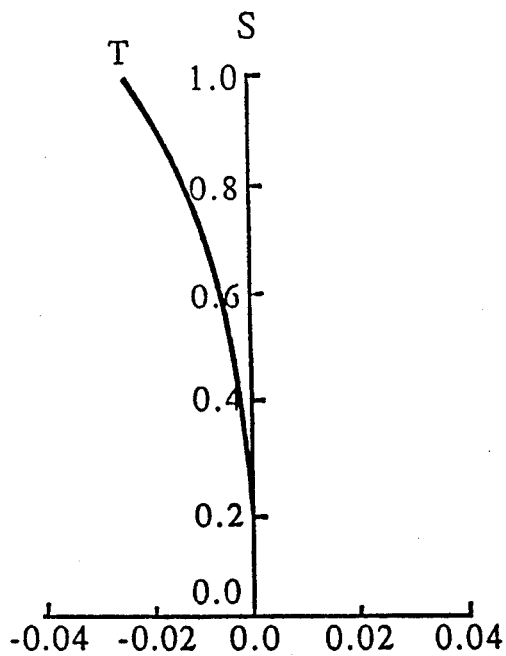

FIG. 9, FIG. 9a represents the performance of the zoom device for equivalent focal distance of 26.6 mm ($\times 1.1$ magnification of the zoom telescope).

Figure 10A:
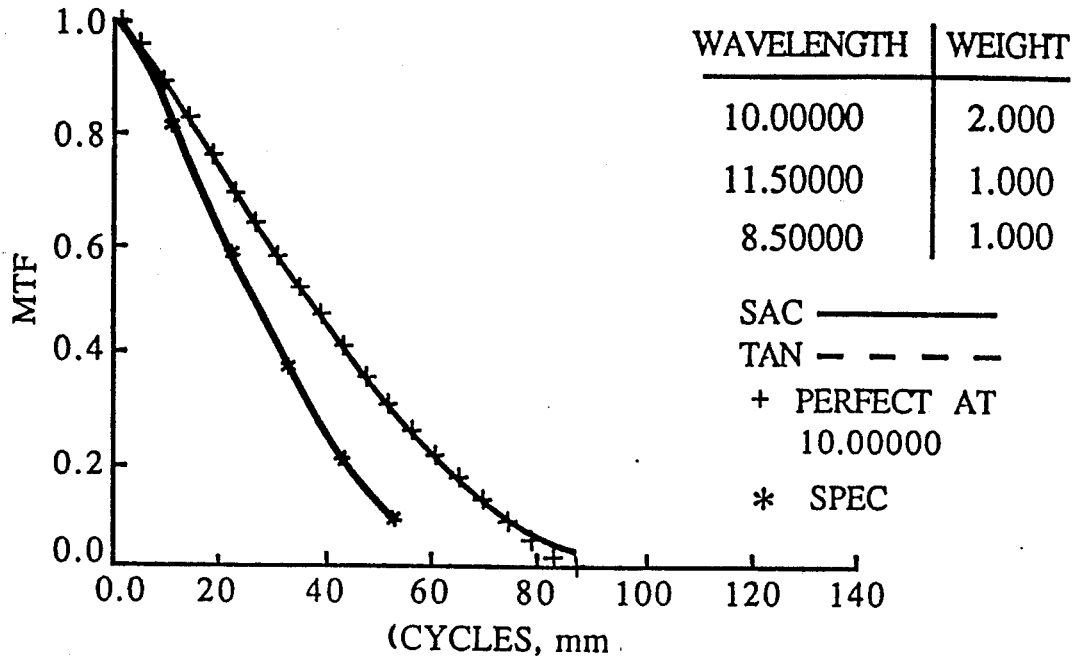
FIGS. 10a–10d give these data for an EFL of 13 mm ($0.54\times$).
Figure 10B:
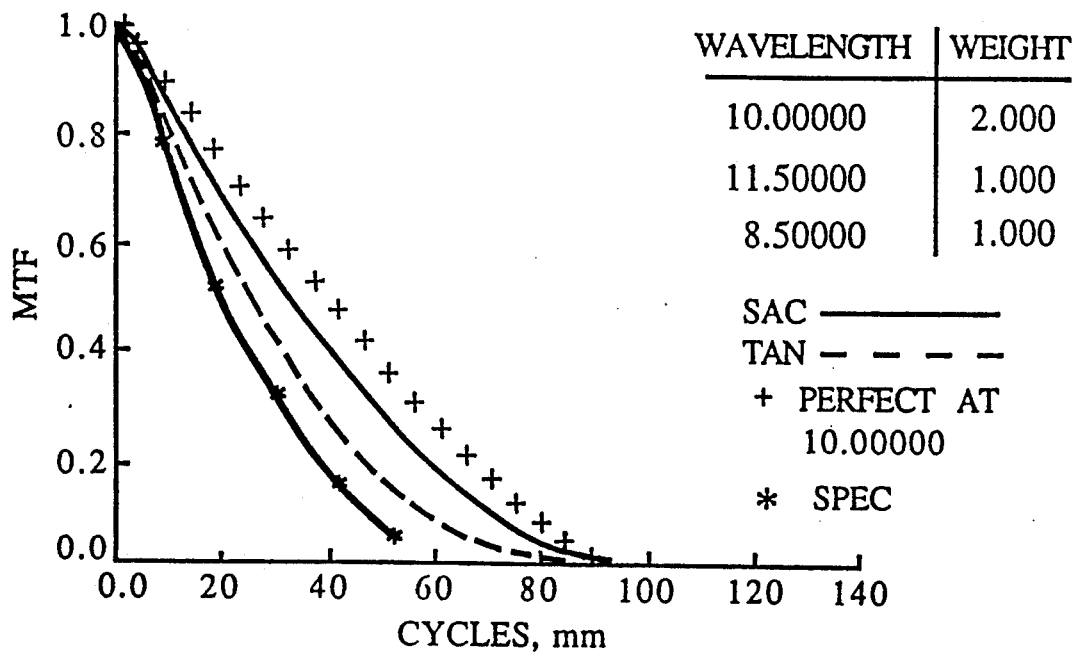
Figure 10C:
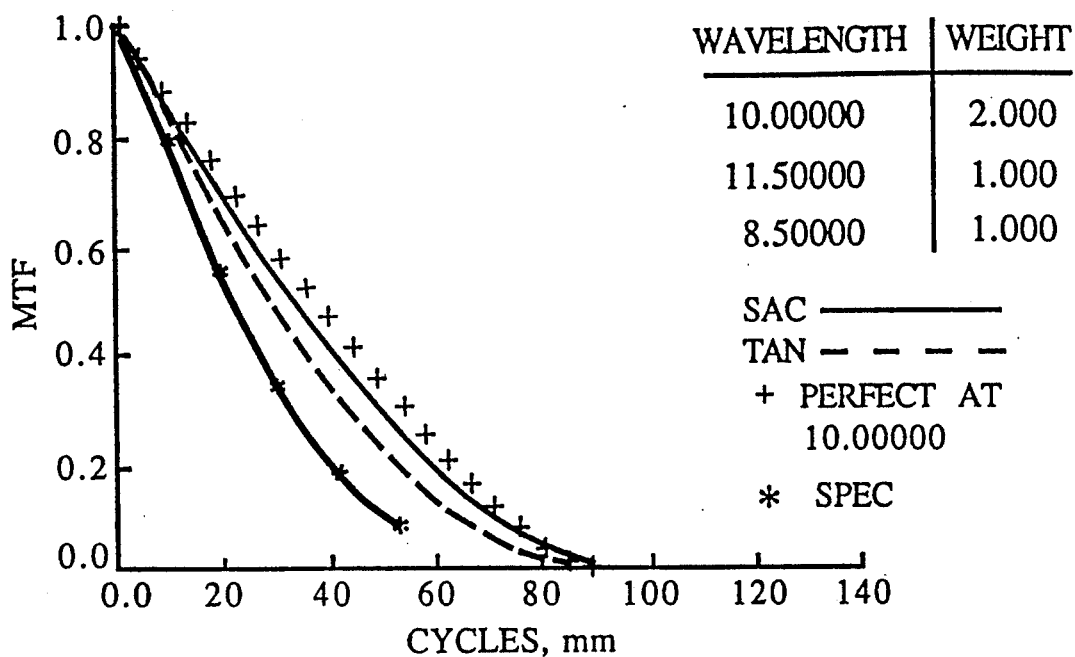
Figure 10D:
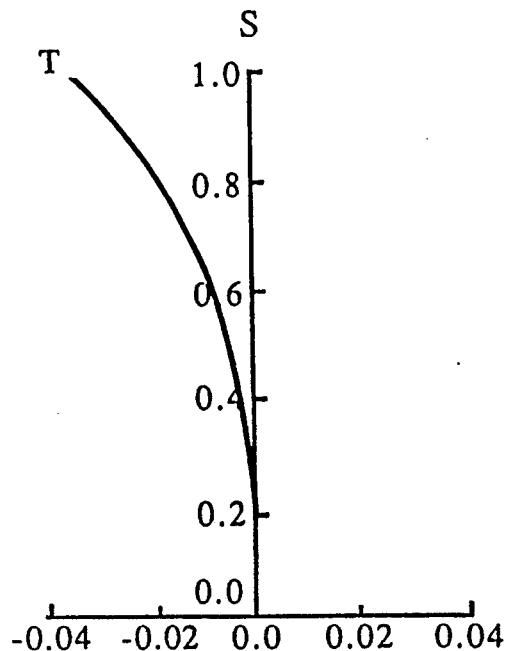

FIG. 10, FIG. 10a represents the performance of the zoom device for equivalent focal distance of 13 mm ($\times 3.54$ magnification of the zoom telescope).

The optical parameters of the design are set in Table I, which is taken at 20° C.

The material of choice of all of the lenses is germanium, except for lens B which is made of zinc selenide. It is of course possible to resort to other optically suitable materials having suitable characteristics. The lenses A and D are fixed in position, with the distance of these being invariable during use. Also the distance between the two lenses B' and B" of movable lens system B is fixed. Accordingly, the infra red (I.R.) zoom telescope of the invention which has full automatic thermal compensation, comprises a total of seven lenses only, which are arranged in five discrete groups, two of which are stationary and three of which are movable and are moved according to a predetermined program which takes into consideration the required magnification and measured temperature.

Focusing of the whole zoom system may be done by additional movement of one of these three lens groups manually or by means of an auto-focus system. In our system the focusing is done by additional movement of the collimator lens group.

Thus the IR zoom telescope of the invention, as illustrated in FIGS. 1a to 1c, comprises in combination lens systems A to E, with lenses A to D defining the objective 11, and lens system E defining a collimator (eyepiece), 12. Lenses A and D are fixedly mounted on the housing 13 of the zoom system, whereas lens B is mounted on carriage 14 which is axially movable on screw 15 by means of electric motor 16, lens C being mounted on carriage 17 which is mounted on screw 18 which is axially movable by electric motor 19, lens E being mounted on carriage 20, which is movable on screw 21 by electric motor 22. The actuation and resulting positioning of the movable lenses or lens systems by means of motors 16, 19 and 22 is determined by control commands given according to precomputed data for each magnification within the magnification range of

TABLE I

| LENS | SURFACE | RADIUS | CONIC CONSTANT | SEPARATION | MATERIAL |
|---|---|---|---|---|---|
| A | $A_1$ | 112.3 | | 11.00 | GE |
| | $A_2$ | 148.3 | | 79.55 ($\times 7.5$) | AIR |
| | | | | 78.34 ($\times 5.3$) | |
| | | | | 75.21 ($\times 3.9$) | |
| | | | | 71.12 ($\times 2.2$) | |
| | | | | 59.64 ($\times 1.1$) | |
| | | | | 43.54 ($\times 0.5$) | |
| B' | $B_1'$ | 193.5 | | 4.89 | ZNSE |
| | $B_2'$ | 110.1 | | 5.48 | AIR |
| B" | $B_1''$ | −865.9 | −0.005671 | 4.00 | GE |
| | $B_2''$ | 79.3 | | 4.01 ($\times 7.5$) | AIR |
| | | | | 20.87 ($\times 5.3$) | |
| | | | | 34.14 ($\times 3.9$) | |
| | | | | 57.45 ($\times 2.2$) | |
| | | | | 74.14 ($\times 1.1$) | |
| | | | | 109.23 ($\times 0.5$) | |
| C | $C_1$ | 1354.7 | | 5.00 | GE |
| | $C_2$ | −187.6 | | 74.98 ($\times 7.5$) | AIR |
| | | | | 59.33 ($\times 5.3$) | |
| | | | | 49.19 ($\times 3.9$) | |
| | | | | 29.97 ($\times 2.2$) | |
| | | | | 24.79 ($\times 1.1$) | |
| | | | | 5.77 ($\times 0.5$) | |
| D' | $D_1'$ | 35.87 | −0.034706 | 7.00 | GE |
| | $D_2'$ | 37.40 | | 57.05 ($\times 7.5$) | AIR |
| | | | | 57.83 ($\times 5.3$) | |
| | | | | 58.72 ($\times 3.9$) | |
| | | | | 59.64 ($\times 2.2$) | |
| | | | | 60.16 ($\times 1.1$) | |
| | | | | 61.08 ($\times 0.5$) | |
| E' | $E_1'$ | −20.59 | | 5.09 | GE |
| | $E_2'$ | −23.30 | | 0.41 | AIR |
| E" | $E_1''$ | 1512.3 | | 5.46 | GE |
| | $E_2''$ | −193.4 | | | AIR | the system, the exact position taking into consideration focal distance and temperature at the instant of actual use.

The instantaneous required magnification is provided by manual input to computing means 23 via control 24, whereas the required focal length is provided as input to computer 23 via control means 25, the actual temperature of the system being monitored by sensor 26 which provides an input to computing means 23.

The above system can be used efficiently with a range of magnification factors as wide as from 0.5× to about 8×, i.e. a factor of 1:16, which exceeds by far that of existing systems. The magnifications are obtained with a near maximum resolution capability over the entire range independent of temperature changes in the range of at least between −35° C. and +55° C. If required, this range can be extended. The system permits a rapid changeover over this wide range of magnifications, and this as a result of the simultaneous movement of the three mobile lens systems in the zoom system, the movements being such as to automatically compensate for temperature changes.

Each of the lens systems B, C and E (the movable ones) are provided with accurate control means which effect the movements with required accuracy. The simultaneous movement of lens systems B, C and E is controlled by microprocessor means which allocates to each such optical element the exact required position with optimum resolution for the intended degree of magnification and temperature.

IR zoom telescope of the invention has been compared with known zoom systems, including those set out in U.K. Pat. No. 2 126 370 and U.K. Pat. No. 1 141 260. Whereas the zoom of the present invention gave highly satisfactory results, computer studies of the systems of the said British systems indicate that these systems are far from giving the desired quality of results.

I claim:

1. An infra-red zoom system providing a high performance over a wide range of magnifications (from about 0.5 to about 8 times), with a correction for temperature changes in the −35° C. to 55° C. range, comprising five optical groups of a total of seven lenses groups (termed herein A to D), which are arranged in the sequence of A, a front singlet lens of positive power with a diameter larger than that of the other lenses and which has a corrected spherical aberration, B a negative optical element consisting of lenses B' and B";

B' and B" being at a fixed distance respective each other;

B' being a negative lens having a dispersive factor larger than that of the other lenses, resulting in a chromatization of the system;

B" is a negative lens

Both negative lenses B' and B" have undercorrected spherical aberrations,

C being a positive lens, modifying with lens B the magnification of the system;

D being a positive auxiliary lens, decreasing the overall length of the system, being at a fixed distance respective lens A;

E being a movable collimator of positive optical power, for maintaining the afocality of the system;

lenses B, C, and E being movable respective fixed lenses A and D, said lenses transmitting in the 3µ to 12µ range, wherein lenses A to D define an objective and E a collimator (eyepiece), the movements of lenses B, C, and E being according to a predetermined program which takes into consideration changes of temperature of the system.

2. A zoom according to claim 1, where the negative lenses B' are made of ZnSe and the other lenses of germanium.

3. An infra-red zoom system according to claim 1, where the lenses are as defined in Table 1, or functional equivalents thereof.

4. A zoom lens system having the following components and parameters:

| LENS | SURFACE | RADIUS | CONIC CONSTANT | SEPARATION | MATERIAL |
|------|---------|--------|----------------|------------|----------|
| A    | $A_1$   | 112.3  |                | 11.00      | GE       |
|      | $A_2$   | 148.3  |                | 79.55 (×7.5) | AIR    |
|      |         |        |                | 78.34 (×5.3) |        |
|      |         |        |                | 75.21 (×3.9) |        |
|      |         |        |                | 71.12 (×2.2) |        |
|      |         |        |                | 59.64 (×1.1) |        |
|      |         |        |                | 43.54 (×0.5) |        |
| B'   | $B_1'$  | 193.5  |                | 4.89       | ZNSE     |
|      | $B_2'$  | 110.1  |                | 5.48       | AIR      |
| B"   | $B_1''$ | −865.9 | −0.005671      | 4.00       | GE       |
|      | $B_2''$ | 79.3   |                | 4.01 (×7.5) | AIR     |
|      |         |        |                | 20.87 (×5.3) |        |
|      |         |        |                | 34.14 (×3.9) |        |
|      |         |        |                | 57.45 (×2.2) |        |
|      |         |        |                | 74.14 (×1.1) |        |
|      |         |        |                | 109.23 (×0.5) |       |
| C    | $C_1$   | 1354.7 |                | 5.00       | GE       |
|      | $C_2$   | −187.6 |                | 74.98 (×7.5) | AIR    |
|      |         |        |                | 59.33 (×5.3) |        |
|      |         |        |                | 49.19 (×3.9) |        |
|      |         |        |                | 29.97 (×2.2) |        |
|      |         |        |                | 24.79 (×1.1) |        |
|      |         |        |                | 5.77 (×0.5) |         |
| D'   | $D_1'$  | 35.87  | −0.034706      | 7.00       | GE       |
|      | $D_2'$  | 37.40  |                | 57.05 (×7.5) | AIR    |
|      |         |        |                | 57.83 (×5.3) |        |
|      |         |        |                | 58.72 (×3.9) |        |
|      |         |        |                | 59.64 (×2.2) |        |
|      |         |        |                | 60.16 (×1.1) |        |
|      |         |        |                | 61.08 (×0.5) |        |
| E'   | $E_1'$  | −20.59 |                | 5.09       | GE       |

| LENS | SURFACE | RADIUS | CONIC CONSTANT | SEPARATION | MATERIAL |
|---|---|---|---|---|---|
|  | E$_2$' | −23.30 |  | 0.41 | AIR |
| E" | E$_1$" | 1512.3 |  | 5.46 | GE |
|  | E$_2$" | −193.4 |  |  | AIR |

* * * * *